June 14, 1955  A. W. HANSON  2,710,651

GAS TANK FOR MODEL AIRPLANE

Filed Dec. 8, 1950

ALDEN W. HANSON
Inventor

By Dean Laurence

Attorney

United States Patent Office 2,710,651
Patented June 14, 1955

2,710,651
GAS TANK FOR MODEL AIRPLANE
Alden W. Hanson, Midland, Mich.

Application December 8, 1950, Serial No. 199,807

5 Claims. (Cl. 158—40)

This invention relates in general to an improved structure for a fuel tank for use in tiltable vehicles, and more specifically to a type thereof adapted for use in a ground controlled, engine driven, model airplane designed for performing aerobatic maneuvers.

The problem of maintaining a continuous supply of fuel of the engine of a ground controlled, model airplane while the plane is performing aerobatic maneuvers is well recognized by persons acquainted with the operation of model airplanes.

In the normal operation of a ground controlled, model plane, operated by wires attached to the controls of the plane, a considerable centrifugal force acts upon the plane due to the fact that the plane must fly around the operator within the radii of the control wires. This centrifugal force tends to force the fuel in the fuel tank toward the outside wall of the tank. Thus, where conventional fuel tanks are used, the fuel supply to the engine of the plane is cut off. Especially, is this likely when the plane is performing aerobatics, such as loops. The combined effects of centrifugal force and tilting of the gas tank during aerobatics makes effective flow up almost impossible, particularly when the fuel supply is low in presently available gas tanks.

Accordingly, a primary object of this invention is the provision of an improved fuel tank for a ground controlled model airplane having an auxiliary fuel tank secured to the main fuel tank whereby a continuous fuel supply to the engine may be maintained regardless of the position of the tank.

Another object of this invention is the provision of an improved fuel tank, as aforesaid, in which the centrifugal force acting on said plane does not impede a continuous flow of fuel to the engine.

A further object of this invention is the provision of an improved fuel tank, as aforesaid, in which a column of fuel is held in hydrostatic balance so that changes in centrifugal acceleration do not affect the rate of fuel to the engine.

A further object of this invention is the provision of an improved fuel tank, as aforesaid, whereby a continuous, constant supply of fuel to the engine will be maintained regardless of the quantity of fuel in the tank.

A further object of this invention is the provision of an improved fuel tank, as aforesaid, having twin vent openings whereby a continuous supply of air may be provided above the gas line in the auxiliary tank regardless of the position of the tank.

A further object of this invention is the provision of an improved fuel tank, as aforesaid, having an auxiliary tank secured to the main fuel tank and provided with a V-shaped outer wall, whereby a maximum efficiency in fuel supply may be maintained.

Other objects and features of the invention will become apparent to those familiar with this type of equipment by reference to the following description and drawings.

In meeting the above outlined objects and purposes heretofore mentioned I have provided a fuel tank comprised of a main tank and an auxiliary tank which is secured to one side wall of said main tank midway between the top and bottom thereof. An opening is provided in said sidewall communicating between said main tank and said auxiliary tank. The auxiliary tank has a V-shaped wall remote from said sidewall with a fuel outlet tube disposed therein and a pair of parallel vent pipes extending into said auxiliary tank, one through the top and one through the bottom, thereof.

Figure 3:
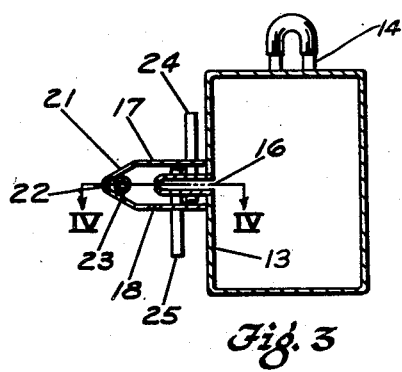
Figure 3 is a sectional view taken along line III—III of Figure 2.

For the purpose of convenience in description, the terms "upward" or "upwardly" and "down" or "downwardly" may sometimes hereinafter be used in referring to the fuel tank, or parts thereof when positioned as shown in Figure 3. The terms "outer" or "outwardly" and "inner" or "inwardly" may be used with references to parts to the left and right, respectively of Figure 3.

Construction

Figure 1:
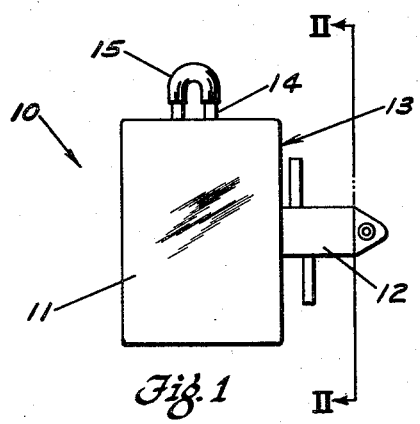
Figure 1 is a side elevation of my improved fuel tank.
Figure 2:
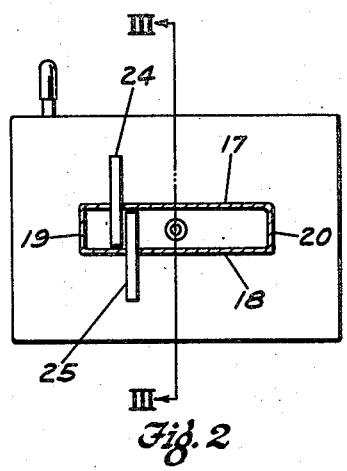
Figure 2 is a sectional view taken along the line II—II of Figure 1.

As shown in Figures 1, 2 and 3 the gas tank 10 is comprised of a rectangular main tank 11 and an auxiliary tank 12 secured to the exterior of the outer sidewall 13 of said main tank substantially midway between the upper and lower ends thereof.

Although the main tank 11, which may be made of any suitable material, such as light metal is disclosed as rectangular in shape, it is to be understood that other shapes may be used. As shown in Figure 3 the tank 11 has a gas inlet pipe 14 with a cap 15 and an opening 16 through the sidewall 13 communicating between the main tank 11 and the auxiliary tank 12. The opening 16, Figures 3 and 4, which is small in diameter, is preferably positioned in the center of sidewall 13.

The auxiliary tank 12 (Figures 3 and 4) which is secured to the main tank 11 by any conventional means, such as welding, is substantially smaller both in volume and in height than said main tank 11. The upper and lower walls 17 and 18 and the end walls 19 and 20 (Figure 2) of the auxiliary tank 12 extend outwardly from said main tank 11 and perpendicularly thereto. The outer wall 21 of said auxiliary tank 12 remote from said sidewall 13, is V-shaped. The line of intersection 22 of the sloping portions of the outer wall 21 is parallel with the sidewall 13 and upper and lower walls 17 and 18, and opposite the opening 16.

Figure 4:
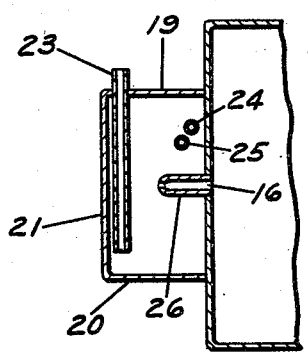
Figure 4 is a sectional view taken along line IV—IV of Figure 3.

As shown in Figures 2, 3, and 4, the auxiliary tank 12 has an outlet tube 23 extending into said tank through the end wall 19 adjacent to, and parallel with, the line of intersection 22 of the sides of said V-shaped outer wall 21. The tube 23 extends toward but is spaced from the end wall 20 of the auxiliary tank 12.

The parallel went pipes 24 and 25 (Figures 2, 3, and 4) extend respectively through the upper and lower walls 17 and 18, of the auxiliary tank 12 and are positioned adjacent to the sidewall 13 between the end wall 19 and the opening 16. The pipe 24 extends toward but is spaced from the lower wall 18 and is perpendicular to the tube 23. The pipe 25 extends similarly toward the upper wall 17.

A nipple 26 (Figures 3 and 4) is secured to said sidewall 13 around said opening 16, by any conventional means such as welding and extends into the auxiliary tank 12 toward the outlet tube 23 in a position parallel to the upper and lower walls 17 and 18 of said auxiliary tank.

In the modified tank 30 (Figure 5) the auxiliary tank 31 is spaced from the main tank 32. The connecting tube 33 between the main and auxiliary tanks may be either stiff or flexible. In all other respects, the tank 30 is substantially identical to the tank 10.

*Operation*

In operation, the main tank 11 is filled with fuel through the fuel inlet pipe 14. During the filling operation, the exterior openings in vent pipes 24 and 25 are preferably closed. When the gas reaches the level of the opening 16 gas will flow through the nipple 26 into the auxiliary tank 12. The remainder of the main tank will then become filled and the fuel inlet pipe may be closed with cap 15.

Figure 5:
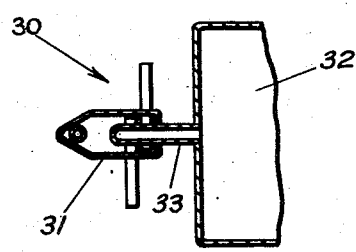
Figure 5 is a sectional view of a modification of my invention substantially as taken along the line III—III of Figure 2.

The fuel tank 10 is mounted in the model plane (not shown) so that the main tank 11 is toward the person operating the control wires. Accordingly, the auxiliary tank is disposed away from the operator and is, therefore, on the outside of the circle defined by the plane during a controlled flight. The same applies to the relative dispositions of the main and auxiliary tanks of the modified tank 30 (Figure 5).

The fuel is drawn into the engine (not shown) through the tube 23 which is fed by the auxiliary tank 12. As the auxiliary tank empties the fuel in the main tank 11 flows into the auxiliary tank through nipple 26 replacing the fuel leaving the auxiliary tank.

Since the auxiliary tank 12 (Figure 3) is on the outside wall 13 of the main tank 11, centrifugal force urges the fuel out of the main tank and into the auxiliary tank as fast as the fuel leaves the auxiliary tank through the outlet tube 23. The V-shaped outer wall 21 combined with the disposition of the tube 23 in the V, insures a continuous supply of fuel to the tube 23 down to the last few drops of fuel. This is true, because centrifugal force urges the fuel toward the V-shaped outer wall 21, after it reaches the auxiliary tank.

The function of the vent pipes 24 and 25 in flight is to provide an aspirating effect in the auxiliary tank 12 and compensating flow from the main tank 11 when the level of the fuel in the auxiliary tank 12 drops below the level of the opening 16 connecting the main tank 11 with the auxiliary tank 12. Thus the arrangement of vent pipes 24 and 25 in the auxiliary tank 12 provides a hydrostatic check valve metering the centrifugally available amount of fuel at any given time into the auxiliary tank 12. The opening 16 is at a level in the auxiliary tank 12 between the ends of vent pipes 24 and 25 and when the fuel in the auxiliary tank reaches the level of the opening 16 the main tank 11 is thus sealed, being otherwise sealed by the fuel cap 15.

Thus, even when the supply of fuel in the main tank 11 is low, the gas will be forced by centrifugal force into the tube 23.

The centrifugal force will urge the fuel into the auxiliary tank regardless of the plane's attitude, such as when in a loop, as the wall 13 will always be furthest from the operator while the plane is in flight.

The dual vent pipes 24 and 25 provide a constant supply of air to the auxiliary tank, regardless of the position of the plane, thereby preventing a vacuum which would stop the gas flow.

The tank 10 may be positioned in the model plane so that the auxiliary tank is on substantially the same level as the fuel jet of the engine (not shown). Thus, the fuel outlet tube 23 is also on approximately the same level, and a continuous supply of fuel to the engine is insured, regardless of the attitude of the plane. Such is not the case in present fuel tanks where the fuel outlet pipe is, of necessity, not disposed at the horizontal centerline of the main tank.

I claim:

1. In a fuel tank for a miniature airplane having ground controlled wires attached thereto, the combination comprising: a main tank having a sidewall; an auxiliary tank mounted upon said sidewall exteriorly of said main tank and substantially midway between the upper and lower ends thereof, said auxiliary tank being substantially smaller both in volume and in height than said main tank; an opening in said sidewall communicating between said main tank and said auxiliary tank; a tube horizontally disposed within said auxiliary tank remote from said sidewall and substantially parallel therewith, said tube extending through one end of said auxiliary tank; and a pair of substantially parallel vent pipes extending into said auxiliary tank, one through the top and the other through the bottom thereof extending into and substantially through said auxiliary tank but stopping before engaging the opposite side of said auxiliary tank whereby said opening between said main tank and said auxiliary tank is at a level substantially midway between the ends of said vent pipes within said auxiliary tank sealing said main tank when the fuel level rises to close the said opening, said main tank being otherwise sealed; whereby fuel within said main tank will generally flow through said tube in virtually all of the flight positions of said tank.

2. In a fuel tank for a miniature airplane having ground controlled wires attached thereto, the combination comprising: a rectangular main tank having a sidewall and a fuel inlet means; substantially rectangular auxiliary tank mounted upon said sidewall exteriorly of said main tank and substantially midway between the upper and lower ends thereof, said auxiliary tank being substantially smaller both in volume and in height than said main tank and having a V-shaped wall remote from said sidewall; an opening in said sidewall communicating between said main tank and said auxiliary tank; a tube horizontally disposed within said auxiliary tank near the line of intersection of the sides of said V-shaped wall and substantially parallel therewith, said tube extending through one end of said auxiliary tank; and a pair of substantially parallel vent pipes extending into said auxiliary tank, one through the top and the other through the bottom thereof extending into and substantially through said auxiliary tank but stopping before engaging the opposite side of said auxiliary tank whereby said opening between said main tank and said auxiliary tank is at a level substantially midway between the ends of said vent pipes within said auxiliary tank sealing said main tank when the fuel level rises to close the said opening, said main tank being otherwise sealed; whereby fuel within said main tank will generally flow through said tube in virtually all of the flight positions of said tank.

3. In a fuel tank for a miniature airplane having ground controlled wires attached thereto, the combination comprising: a rectangular main tank having a sidewall and a fuel inlet means; a substantially rectangular auxiliary tank mounted upon said sidewall exteriorly of said main tank and substantially midway between the upper and lower ends thereof, said auxiliary tank being substantially smaller both in volume and in height than said main tank and having a V-shaped wall remote from said sidewall; an opening in said sidewall communicating between said main tank and said auxiliary tank; a nipple secured to said sidewall around said opening and extending into said auxiliary tank; a tube horizontally disposed within said auxiliary tank near the converging side of said V-shaped wall and substantially parallel therewith, said tube extending through one end of said auxiliary tank; and a pair of substantially parallel vent pipes extending into said auxiliary tank, one through the top and the other through the bottom thereof extending into and substantially through said auxiliary tank but stopping before engaging the opposite side of said auxiliary tank whereby said opening between said main tank and said auxiliary tank is at a level substantially midway between the ends of said vent pipes within said auxiliary tank sealing said main tank when the fuel level rises to close the said opening, said main tank being otherwise sealed; whereby fuel within said main tank will generally flow through said tube in virtually all of the flight positions of said tank.

4. In a fuel tank for a miniature airplane having ground controlled wires attached thereto, the combination comprising: a rectangular main tank having a sidewall and a fuel inlet means; a substantially rectangular auxiliary tank mounted upon said sidewall exteriorly of said main tank and substantially midway between the upper and lower ends thereof, said auxiliary tank being substantially smaller both in volume and in height than said main tank and having a V-shaped wall remote from said sidewall; an opening in said sidewall communicating between said main tank and said auxiliary tank; a tube horizontally disposed within said auxiliary tank near the line of intersection of the sides of said V-shaped wall and substantially parallel therewith, said tube extending through one end of said auxiliary tank; a first vent pipe extending into said auxiliary tank through the bottom thereof, being perpendicular to said tube and extending toward but spaced from the top of said auxiliary tank; a second vent pipe, parallel to said first vent pipe, extending into said auxiliary tank through the top thereof whereby said opening between said main tank and said auxiliary tank is at a level substantially midway between the ends of said vent pipes within said auxiliary tank sealing said main tank when the fuel level rises to close the said opening, said main tank being otherwise sealed, being perpendicular to said tube and extending toward but spaced from the bottom of said auxiliary tank; whereby fuel within said main tank will generally flow through said tube in virtually all of the flight positions of said tank.

5. In a fuel tank for a miniature ground controlled airplane the combination including: a main tank having a sidewall; an auxiliary tank remote from said main tank and connectable to said main tank through said sidewall, said auxiliary tank being substantially smaller in volume and height than said main tank; a tubular opening through said sidewall connectably and centrifugally communicating the contents of said main tank with the interior of said auxiliary tank and said opening extending into said auxiliary tank and opening thereinto at a level in said auxiliary tank substantially midway between the upper and lower limits of said auxiliary tank so that said main tank is completely sealed when fuel centrifugally delivered to said auxiliary tank rises to the level of said opening into said auxiliary tank; a pair of substantially parallel vent pipes extending into said auxiliary tank, one through the top and the other through the bottom thereof and stopping before engaging the opposite side of said auxiliary tank; and a tube horizontally disposed within said auxiliary tank remote from said opening and substantially perpendicular thereto constituting a delivery conduit for fuel.

References Cited in the file of this patent

UNITED STATES PATENTS

| | | |
|---|---|---|
| 1,364,770 | Linberg | Jan. 4, 1921 |
| 2,583,932 | Daebelliehn | Jan. 29, 1952 |